US009342115B2

(12) United States Patent
Peng et al.

(10) Patent No.: US 9,342,115 B2
(45) Date of Patent: May 17, 2016

(54) MOUNTING APPARATUS OF DATA STORAGE DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wen-Tang Peng, New Taipei (TW); Xiao-Zheng Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/578,858

(22) Filed: Dec. 22, 2014

(65) Prior Publication Data

US 2015/0185789 A1    Jul. 2, 2015

(30) Foreign Application Priority Data

Dec. 27, 2013 (CN) .......................... 2013 1 0733642

(51) Int. Cl.
*G06F 1/18* (2006.01)
*F16M 11/04* (2006.01)
*F16M 13/02* (2006.01)
*G11B 33/12* (2006.01)

(52) U.S. Cl.
CPC .............. *G06F 1/183* (2013.01); *F16M 11/041* (2013.01); *F16M 13/02* (2013.01); *F16M 2200/02* (2013.01); *G06F 1/187* (2013.01); *G11B 33/123* (2013.01)

(58) Field of Classification Search
CPC ......... G06F 1/187; G06F 1/184; G06F 1/183; G11B 33/123; G11B 33/124; H05K 7/1409; F16M 2200/02

USPC ............. 361/679.33, 679.58, 679.02, 679.37, 361/755; 312/223.1; 248/221.11
See application file for complete search history.

(56) References Cited

U.S. PATENT DOCUMENTS

| 4,083,616 | A | * | 4/1978 | McNiece | ............ E05B 17/0025 439/157 |
| 5,481,431 | A | * | 1/1996 | Siahpolo | ................. G06F 1/184 361/679.31 |
| 6,337,793 | B1 | * | 1/2002 | Vier | ........................ G06F 1/184 312/223.2 |
| 6,452,792 | B1 | * | 9/2002 | Chen | ....................... G06F 1/184 312/223.1 |

(Continued)

*Primary Examiner* — Adrian S Wilson
*Assistant Examiner* — Abhishek Rathod
(74) *Attorney, Agent, or Firm* — Novak Druce Connolly + Quigg LLP

(57) ABSTRACT

A mounting apparatus for a data storage device defining mounting holes in opposite first side and second side, the mounting apparatus includes a mounting plate, a first mounting member mounted to the mounting plate, a second mounting member mounted to the mounting plate, a pivoting member pivotably connected to a first side of the data storage device, and a locking member pivotably connected to the pivoting member. The first mounting member includes a supporting piece and two tips. The second mounting member includes a locking piece and a block formed at an end of the locking piece. The locking member includes a locking portion. The tips engage in the mounting holes of a second side of the data storage device. The pivoting member is rotated to be located between the second mounting member and the data storage device, and the locking member is rotated to engage under the block.

10 Claims, 5 Drawing Sheets

(56) References Cited

U.S. PATENT DOCUMENTS

| | | | | |
|---|---|---|---|---|
| 6,580,617 B2 * | 6/2003 | Kao | ............... | H05K 7/1411 361/679.26 |
| 6,657,868 B1 * | 12/2003 | Hsue | ............... | G11B 33/128 174/138 G |
| 6,751,093 B1 * | 6/2004 | Hsu | ............... | G06F 1/184 361/679.33 |
| 7,344,394 B1 * | 3/2008 | Barina | ............... | G06F 1/183 361/755 |
| 7,400,936 B2 * | 7/2008 | Chang | ............... | G06F 1/184 361/679.33 |
| 8,113,474 B1 * | 2/2012 | Li | ............... | G11B 33/124 248/221.11 |
| 8,289,695 B2 * | 10/2012 | Wu | ............... | G06F 1/187 361/679.33 |
| 8,749,966 B1 * | 6/2014 | Boudreau | ............... | G06F 1/187 361/679.33 |
| 9,047,063 B2 * | 6/2015 | Chang | ............... | G06F 1/187 |
| 2005/0190535 A1 * | 9/2005 | Peng | ............... | G06F 1/187 361/679.32 |
| 2006/0171110 A1 * | 8/2006 | Li | ............... | G06F 1/184 361/679.37 |
| 2007/0115626 A1 * | 5/2007 | Peng | ............... | G06F 1/187 361/679.57 |
| 2011/0049319 A1 * | 3/2011 | Peng | ............... | G06F 1/187 248/309.1 |
| 2011/0175501 A1 * | 7/2011 | Peng | ............... | G11B 33/124 312/223.1 |
| 2011/0289521 A1 * | 11/2011 | Chen | ............... | G11B 33/124 720/601 |
| 2012/0087084 A1 * | 4/2012 | Nguyen | ............... | G11B 33/124 361/679.37 |
| 2012/0145862 A1 * | 6/2012 | Peng | ............... | G06F 1/187 248/298.1 |
| 2013/0007328 A1 * | 1/2013 | Peng | ............... | G06F 1/181 710/301 |
| 2013/0277512 A1 * | 10/2013 | He | ............... | G11B 33/124 248/213.2 |
| 2014/0362515 A1 * | 12/2014 | Pronozuk | ............... | H05K 7/1488 361/679.31 |

\* cited by examiner

MOUNTING APPARATUS OF DATA STORAGE DEVICE

FIELD

The subject matter herein generally relates to a mounting apparatus of data storage device.

BACKGROUND

Data storage devices are generally mounted on a bracket via screws and the bracket is then mounted in an electronic device.

BRIEF DESCRIPTION OF THE DRAWINGS

Implementations of the present technology will now be described, by way of example only, with reference to the attached figures.

DETAILED DESCRIPTION

Figure 1:
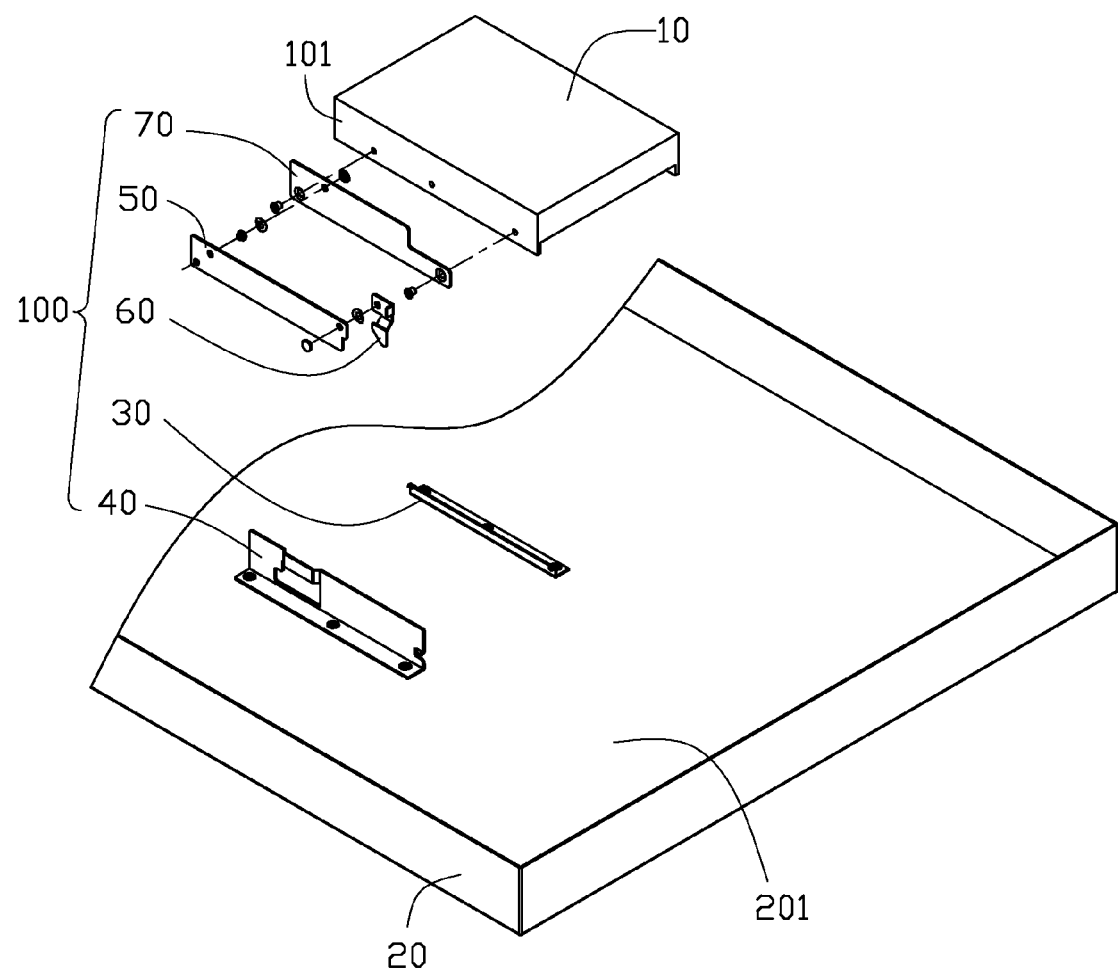
FIG. 1 is an exploded, isometric view of an embodiment of a mounting apparatus of data storage device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a mounting apparatus of data storage device.

Figure 2:
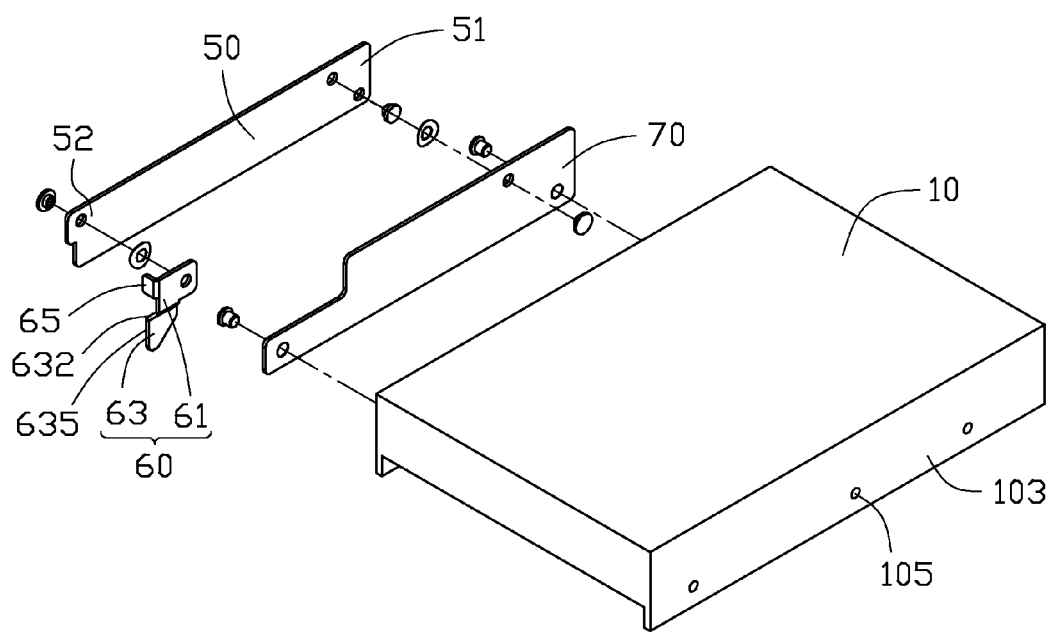
FIG. 2 is a partial, isometric view of FIG. 1, but viewed from another angle.
Figure 3:
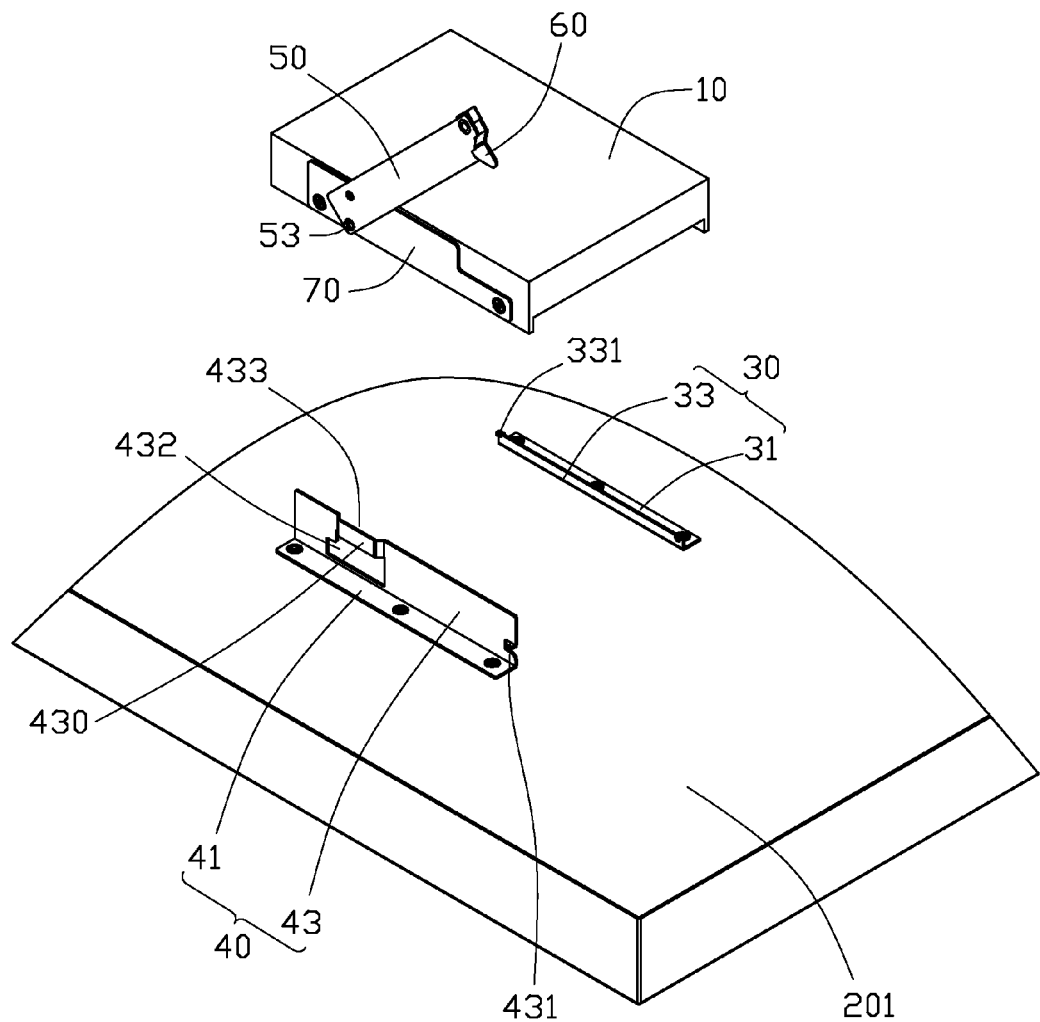
FIG. 3 is partial, assembled, isometric view of FIG. 1.

FIGS. 1-3 illustrate a mounting apparatus 100 for mounting a data storage device 10 in a chassis 20 of an electronic device. The mounting apparatus 100 comprises a first mounting member 30, a second mounting member 40, a pivoting member 50, a locking member 60, and a connecting member 70.

The data storage device 10 comprises a first side 101 and a second side 103 opposite to the first side 101. The first side 101 and second side 103 respectively define a plurality of mounting holes 105.

The chassis 20 comprises a mounting plate 201.

The first mounting member 30 and the second mounting member 40 are mounted to the mounting plate 201, in parallel with each other. The first mounting member 30 is opposite to the second mounting member 40. The first mounting member 30 is substantially L-shaped and comprises a positioning piece 31 mounted to the mounting plate 201 and a supporting piece 33 extending substantially perpendicular up from a side of the positioning piece 31. Two tips 331 protrude substantially perpendicular from two opposite ends of the supporting piece 33 toward the second mounting member 40. The second mounting member 40 is substantially L-shaped and comprises a positioning piece 41 mounted to the mounting plate 201 and a locking piece 43 extending substantially perpendicular up from a side of the positioning piece 41. The locking piece 43 is parallel and opposite to the supporting piece 33. A block 431 extends perpendicularly from an end of the locking piece 43 away from the first mounting member 30. A lower portion of the locking piece 43 defines a locking slot 432 away from the block 431. A bridge-shaped protrusion 430 protrudes outward from an upper portion of the locking piece 43, above the locking slot 432. A receiving space 433 is defined in the protrusion 430.

The pivoting member 50 and the connecting member 70 are substantially rectangular. The connecting member 70 is mounted to the first side of the data storage device 10 via a plurality of screws. The pivoting member 50 comprises a first end 51 and a second end 52 opposite to the first end 51. The first end 51 of the pivoting member 50 is pivotably connected to an end of the connecting member 70, and the locking member 60 is pivotably connected to the second end 52 of the pivoting member 50. A pole 53 extends substantially perpendicular from the first end 51 of the pivoting member 50 away from the connecting member 70. The locking member 60 comprises a pivoting piece 61, a locking portion 63 extending down from an end of a bottom side of the pivoting piece 61, and an operating piece 65 substantially perpendicularly extending from the end of the pivoting piece 61 away from the data storage device 10. The locking portion 63 comprises an extending piece 632 slantingly extending from the pivoting piece 61 away from the connecting member 70 and a locking piece 635 extending down from a distal end of the extending piece 632. In the embodiment, the first end 51 of the pivoting member 50 is pivotably connected to the connecting member 70 via a screw, a resilient washer is fitted about the screw between the pivoting member 50 and the connecting member 70 to increase damping when the pivoting member 50 is pivoting relative to the connecting member 70. The latching member 60 is connected to the second end of the pivoting member 50 via a screw, a resilient washer is fitted about the screw between the latching member 60 and the pivoting member 50 to increase damping when the locking member 60 is pivoting relative to the pivoting member 50.

Figure 4:
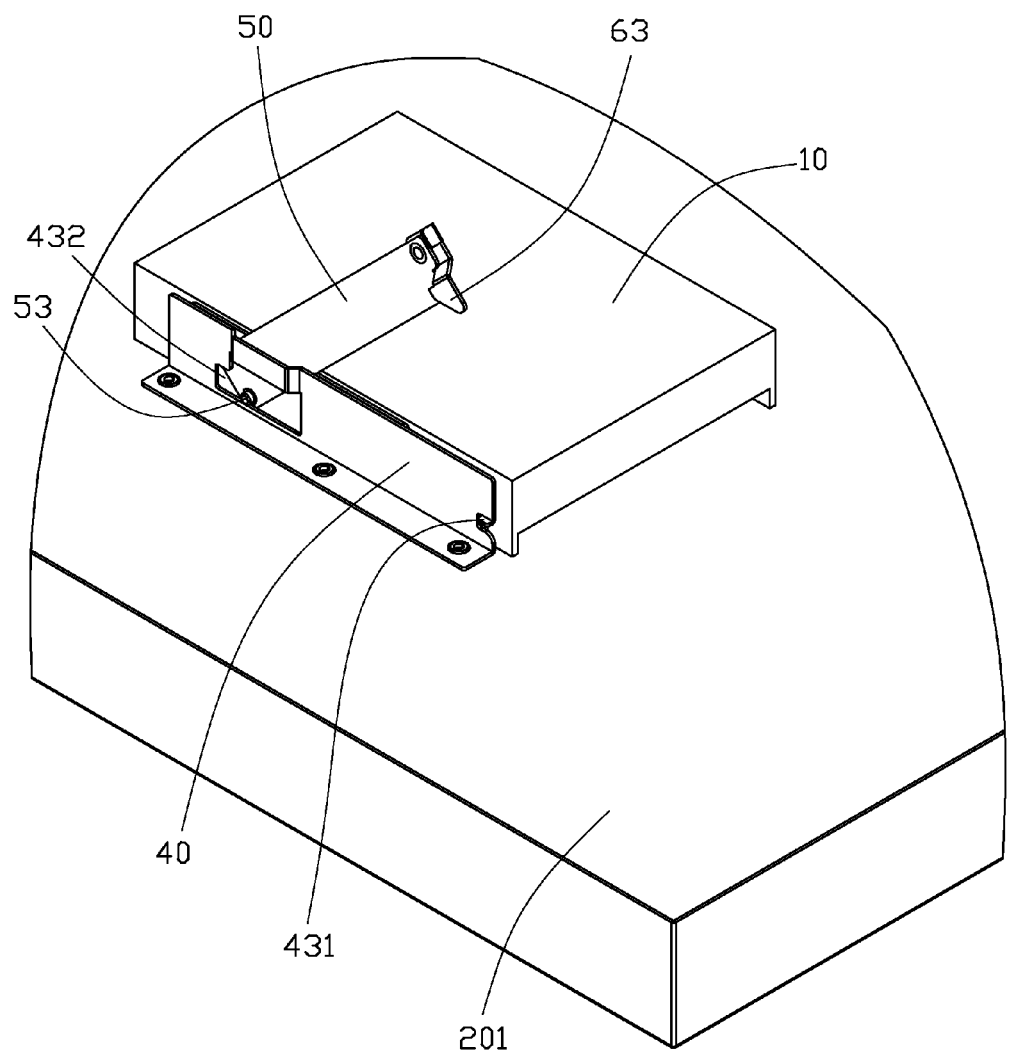
FIG. 4 is an assembled, isometric view of FIG. 1, shows the data storage device in an unlocked configuration.
Figure 5:
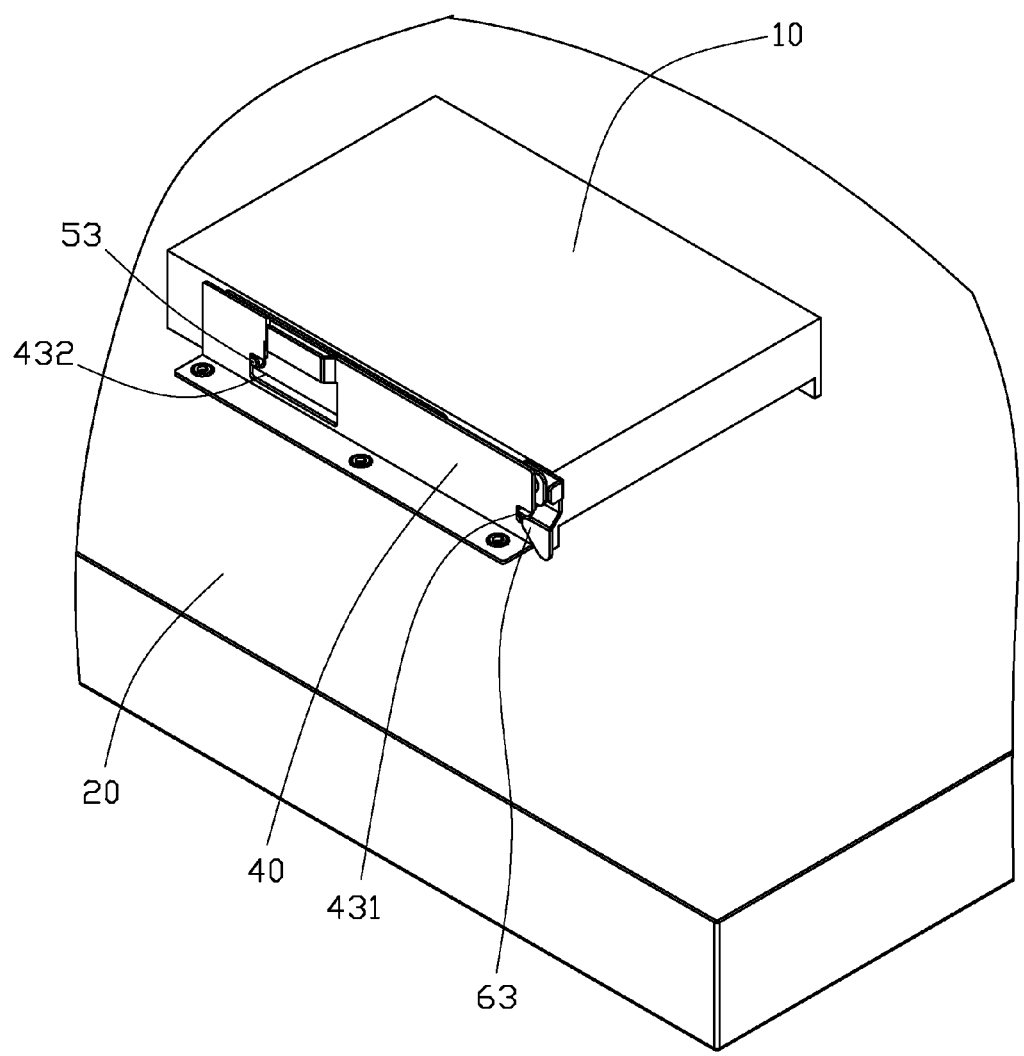
FIG. 5 is similar to FIG. 4, but shows the data storage device in a locked configuration.

FIGS. 4-5 illustrate the mounting apparatus 100 to install the data storage device 10. The data storage device 10 is slantingly located between the first mounting member 30 and the second mounting member 40 to allow the tips 331 of the first mounting member 30 to engage in the mounting holes 105 of the second side surface 103 of the data storage device 10. The data storage device 10 is supported on the mounting plate 201 and located between the first mounting member 30 and the second mounting member 40, and the pole 53 extends through in the locking slot 432. The pivoting member 50 is rotated toward the mounting plate 201 until the pivoting member 50 is parallel to the locking piece 43 and located between the second mounting member 40 and the connecting member 70, and the pole 53 of the pivoting member 50 abuts against a bottom of the protrusion 430. The operating piece 65 is operated to rotate the pivoting piece 61 toward the mounting plate 201 until the locking piece 635 is engaged under the block 431 of the second mounting member 43. The data storage device 10 is mounted to the mounting apparatus 100.

In another embodiment, the connecting member 70 can be omitted, the first end 51 of the pivoting member 50 can be directly and pivotably connected to the mounting hole 105 of the first side surface 101 of the data storage device 10.

Even though numerous characteristics and advantages of the embodiments have been set forth in the foregoing description, together with details of the structure and function of the embodiments, the present disclosure is illustrative only, and changes may be made in detail, including in the matters of shape, size, and arrangement of parts within the principles of the embodiments to the full extent indicated by the broad general meaning of the terms in which the appended claims are expressed.

What is claimed is:

1. A mounting apparatus for mounting a data storage device defining mounting holes in a first side and a second side opposite the first side, comprising:
    a mounting plate;
    a first mounting member mounted to the mounting plate and comprising a supporting piece perpendicularly mounted to the mounting plate and comprising a plurality of tips extending from the supporting piece;
    a second mounting member mounted to the mounting plate and comprising a locking piece parallel and opposite to the supporting piece, the locking piece forming a block at an end thereof;
    a pivoting member comprising a first end pivotably connected to the first side of the data storage device and a second end opposite to the first end; and
    a locking member pivotably connected to the second end of the pivoting member and comprising a locking portion;
    wherein the plurality of tips extending toward the locking piece, the data storage device is arranged between the supporting piece and the locking piece, the plurality of tips of the first mounting member engage in the mounting holes of the second side of the data storage device, the pivoting member is rotated to be located between the locking piece and the first side of the data storage device, and the locking member is rotated to allow the locking member to engage with the block of the second mounting member.

2. The mounting apparatus of claim 1, further comparing a connecting member mounted to the first side of the data storage device, wherein the first end of the pivoting member is pivotably attached to the connecting member.

3. The mounting apparatus of claim 1, wherein the locking member comprises a pivoting piece pivotably connected to the second end of the pivoting member, an extending piece slantingly extending from the pivoting piece, and a locking piece extending down from a distal end of the extending piece.

4. The mounting apparatus of claim 3, wherein the locking member further comprises an operating piece extending from an end of the pivoting piece.

5. The mounting apparatus of claim 1, wherein the locking piece defines a locking slot, a pole extends through the slot to pivotably engage the first end of the pivoting member.

6. An electronic device comprising:
    a chassis comprising a mounting plate;
    a data storage device comprising a first side and second side opposite to the first side,
    a plurality of mounting holes defined the first side and the second side; and
    a first mounting member mounted to the mounting plate and comprising a supporting piece perpendicular to the mounting plate and the supporting piece comprising a plurality of tips extending from the supporting piece;
    a second mounting member mounted to the mounting plate and comprising a locking piece parallel and opposite to the supporting piece, a block formed at an end of the locking piece;
    a pivoting member comprising a first end pivotably connected to the first side of the data storage device and a second end opposite to the first end; and
    a locking member pivotably connected to the second end of the pivoting member and comprising a locking portion;
    wherein the data storage device is arranged between the first and second mounting members, the tips of the first mounting member engage in the mounting holes of the second side of the data storage device, the pivoting member is rotated to be located between the second mounting member and the data storage device, and the locking member is rotated toward the locking piece, until the locking member engage with the block of the second mounting member.

7. The electronic device of claim 6, further comparing a connecting member mounted to the first side of the data storage device, wherein the first end of the pivoting member is pivotably attached to the connecting member.

8. The electronic device of claim 6, wherein the locking member comprises a pivoting piece pivotably connected to the second end of the pivoting member, an extending piece slantingly extending from the pivoting piece, and a locking piece extending down from a distal end of the extending piece.

9. The electronic device of claim 8, wherein the locking member further comprises an operating piece extending from an end of the pivoting piece.

10. The electronic device of claim 6, wherein the locking piece defines a locking slot, a pole extending through the slot to pivotably engage the first end of the pivoting member.

* * * * *